(12) United States Patent
Sasaki

(10) Patent No.: US 9,082,283 B2
(45) Date of Patent: Jul. 14, 2015

(54) DRIVER CONDITION ASSESSMENT DEVICE

(75) Inventor: Shotaro Sasaki, Susono-shi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/006,887

(22) PCT Filed: Apr. 18, 2011

(86) PCT No.: PCT/JP2011/059544
§ 371 (c)(1),
(2), (4) Date: Sep. 23, 2013

(87) PCT Pub. No.: WO2012/143999
PCT Pub. Date: Oct. 26, 2012

(65) Prior Publication Data
US 2014/0043166 A1 Feb. 13, 2014

(51) Int. Cl.
*G08B 23/00* (2006.01)
*G08B 21/02* (2006.01)
*G08G 1/16* (2006.01)
*G08B 21/06* (2006.01)
*G06K 9/00* (2006.01)
*B60W 40/08* (2012.01)

(52) U.S. Cl.
CPC ............ *G08B 21/02* (2013.01); *G06K 9/00805* (2013.01); *G06K 9/00845* (2013.01); *G08B 21/06* (2013.01); *G08G 1/166* (2013.01); *G08G 1/167* (2013.01); *B60W 2040/0818* (2013.01); *B60W 2540/18* (2013.01); *B60W 2550/308* (2013.01)

(58) Field of Classification Search
CPC ........ G08B 21/02; G08B 21/06; G08G 1/166; G08G 1/167; G06K 9/00805; G06K 9/00845
USPC ................................ 340/576, 439; 701/70, 93
See application file for complete search history.

(56) References Cited

U.S. PATENT DOCUMENTS

2004/0064240 A1\* 4/2004 Sugano ........................... 701/93
2005/0126841 A1 6/2005 Isaji et al.

FOREIGN PATENT DOCUMENTS

| JP | 2005-173929 A | 6/2005 |
| JP | 2010-026654 A | 2/2010 |
| JP | 2010-029537 A | 2/2010 |
| JP | 2011-216058 A | 10/2011 |

\* cited by examiner

*Primary Examiner* — Thomas Mullen
(74) *Attorney, Agent, or Firm* — Sughure Mion, PLLC

(57) ABSTRACT

A driver condition assessment device is provided which assesses a driver condition of a host vehicle. The device assesses whether a predetermined driving operation is performed, and includes detecting a travelling condition of the host vehicle and detecting a size of a preceding vehicle present ahead of the host vehicle. The device assesses whether a consciousness of a driver of the host vehicle is degraded when a detected travelling condition exceeds a predetermined threshold value and sets the predetermined threshold value depending on the detected size of the preceding vehicle.

3 Claims, 3 Drawing Sheets

DRIVER CONDITION ASSESSMENT DEVICE

CROSS REFERENCE TO RELATED APPLICATIONS

This application is a National Stage of International Application No. PCT/JP2011/059544 filed Apr. 18, 2011, the contents of all of which are incorporated herein by reference in their entirety.

TECHNICAL FIELD

The present invention relates to driver condition assessment device that decides a driver condition by detecting a predetermined driving operation.

BACKGROUND ART

In the related art, a technology is known which checks a driver condition or provides a driver with awareness by detecting a predetermined driving operation. For example, Patent Literature 1 discloses an awareness degree assessment device that enhances an assessment accuracy of driver's degree of awareness by changing the assessment standard which assesses driver's degree of awareness based on whether a preceding vehicle is present. Further, when the preceding vehicle is continuously present for a fixed time within a range of a fixed distance from a host vehicle, a normal steering amount which is steering angle in a normal consciousness state, is calculated by using a preceding vehicle data. Thereafter, a technology is also known which assesses whether a driver consciousness has degraded by using the normal steering amount that has been calculated when the preceding vehicle is present within a fixed distance.

CITATION LIST

Patent Literature

[Patent Literature 1] Japanese Unexamined Patent Application Publication No. 2005-173929
[Patent Literature 2] Japanese Unexamined Patent Application Publication No. 2010-026654
[Patent Literature 3] Japanese Unexamined Patent Application Publication No. 2010-029537

SUMMARY OF INVENTION

Technical Problem

However, for example, when a large-sized vehicle greater in width and height than a normal vehicle is present ahead of the host vehicle, a range where a driver visibility is obstructed gets bigger. As a result, it is thought that a look-ahead driving gets more difficult notwithstanding a driver consciousness is not degraded, thereby increasing a fluctuation of the host vehicle. Accordingly, for example, wrong assessment of a consciousness degradation is likely to be increased notwithstanding the driver consciousness is not degraded when assessment of the consciousness degradation is made in a case where the preceding vehicle is the large-sized one by using the normal steering amount calculated when the preceding vehicle is the normal one. Further, when the normal steering amount is calculated as described above, there is also such a problem that wrong assessment is increased in case where the preceding vehicle appears suddenly since it takes a fixed time to calculate the normal steering amount.

An object of the invention is to provide a driver condition assessment device capable of reducing a wrong assessment of the driver consciousness degradation due to a fluctuation and the like of a steering based on the difference of a size or a type of a preceding vehicle.

Solution to Problem

A driver condition assessment device according to the invention to solve the aforementioned problem, which assesses the driver condition of a host vehicle by assessing whether a predetermined driving operation is performed, includes travelling condition detection means for detecting a travelling condition of the host vehicle; size detection means for detecting a size of a preceding vehicle present ahead of the host vehicle; consciousness degradation assessment means for assessing whether a consciousness of a driver of the host vehicle is degraded when a travelling condition detected by the travelling condition detection means exceeds a predetermined threshold value; and threshold value setting means for setting the predetermined threshold value depending on the size of the preceding vehicle detected by the size detection means.

The driver condition assessment device according to the invention sets the predetermined threshold value in order to assess the driver consciousness degradation based on the size of the preceding vehicle detected by the size detection means when assessing the driver condition. Because of this, when the preceding vehicle is the large-sized one, it is possible to reduce a wrong assessment due to the fluctuation of the host vehicle since setting a threshold value for the large-sized vehicle is performed. In addition, when the preceding vehicle is changed from the large-sized one to a normal-sized one, it is possible to certainly detect the driver consciousness degradation even when the preceding vehicle is changed to the normal-sized one since setting a threshold value for the normal-sized one is performed.

Further, in the driver condition assessment device according to the invention, it is preferable that the travelling condition detection means be steering amount detection means for detecting steering amount of the host vehicle.

In the driver condition assessment device according to the invention, it is possible to assess with higher accuracy whether the driver's consciousness is degraded by the consciousness degradation assessment means based on whether the steering amount exceeds the predetermined threshold value since the fluctuation of a vehicle is directly detected as the steering amount.

Further, in the driver condition assessment device according to the invention, it is preferable that the threshold value setting means perform setting the threshold value such that consciousness is less likely to be assessed as being degraded, as a size of the preceding vehicle increases.

In the driver condition assessment device according to the invention, it is possible to reduce a wrong assessment when the preceding vehicle is a large-sized vehicle, since the larger the size of the preceding vehicle, the less likely consciousness will be assessed as being degraded.

Further, in the driver condition assessment device according to the invention, it is preferable that the threshold value setting means perform setting the threshold value corresponding to the size of the preceding vehicle when the preceding vehicle is continuously present for a fixed time within a fixed distance of the host vehicle, and set the threshold value to a predetermined initial value when the preceding vehicle is not continuously present for the fixed time within the fixed distance of the host vehicle.

In the driver condition assessment device according to the invention, it is possible to reduce a wrong assessment made by the threshold value set when the preceding vehicle is present since the threshold value used for assessing a consciousness degradation is set to the predetermined initial value when the preceding vehicle is not continuously present for a fixed time within a fixed distance of the host vehicle.

Advantageous Effects of Invention

The invention makes it possible to reduce a wrong assessment and the like of the driver consciousness degradation due to a fluctuation of a host vehicle when a preceding vehicle is a large-sized one, and to improve an accuracy of assessment of the driver consciousness degradation.

DESCRIPTION OF EMBODIMENTS

Figure 1:
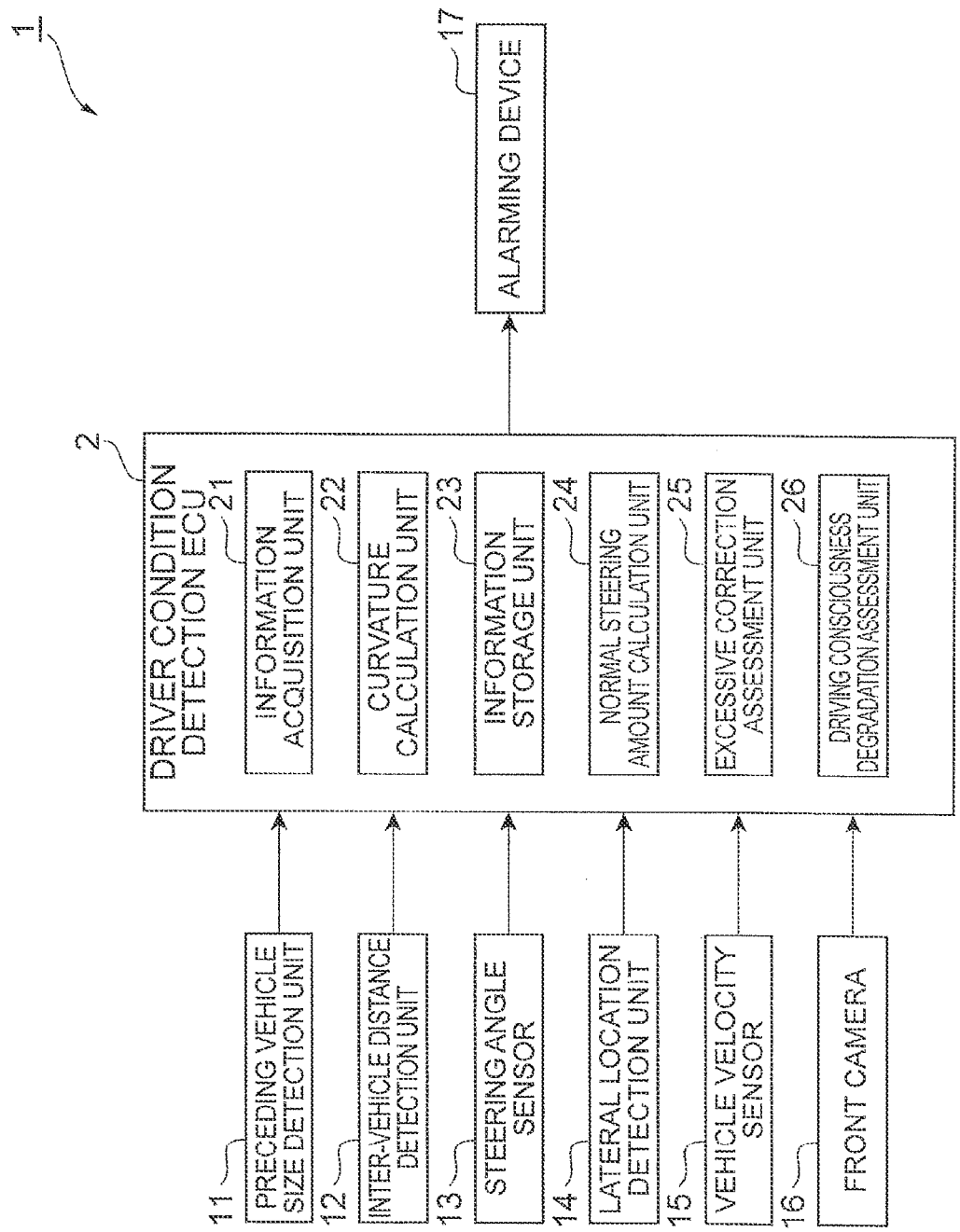
FIG. 1 is a block diagram illustrating a driver condition assessment device according to an embodiment of the invention.

Hereinafter, preferred embodiments of the invention will be described in detail in accordance with the accompanying drawings. In addition, in the following description, the same reference numerals are given to the same or corresponding elements, and the overlapping description is omitted.

FIG. 1 is a block diagram illustrating a driver condition assessment device 1 related to embodiment of the invention. The driver condition assessment device 1 in FIG. 1 performs assessing whether a test subject, namely, a driver who performs a predetermined driving operation is in the state of consciousness degradation.

The driver condition assessment device 1 is provided with a preceding vehicle size detection unit 11, an inter-vehicle distance detection unit 12, a steering angle sensor 13, a lateral location detection unit 14, a vehicle velocity sensor 15, a front camera 16, a driver condition detection ECU (Electronic Control Unit) 2, and a warning device 17.

Various kinds of sensors for measuring vehicle condition including the preceding vehicle size detection unit 11, the inter-vehicle distance detection unit 12, the steering angle sensor 13, the lateral location detection unit 14, the vehicle velocity sensor 15, the front camera 16 and the like are connected to the driver condition detection ECU 2.

The preceding vehicle size detection unit 11 functions as means for detecting size that detects the size of the preceding vehicle which travels ahead of the host vehicle. For example, a communicator capable of acquiring information from the preceding vehicle is used. As information relating to the size of the preceding vehicle, for example, a type and a maximum loading capacity of the preceding vehicle, a wheelbase, and the like are cited. The preceding vehicle size detection unit 11 outputs information acquired from the preceding vehicle to the driver condition detection ECU 2 as a preceding vehicle signal. It is desirable that information of the preceding vehicle acquired by the preceding vehicle size detection unit 11 is used in real time for processing inside of the driver condition detection ECU 2, or is accumulated by storing in an information storage unit 23 described below as well.

The inter-vehicle distance detection unit 12 is installed at a front portion of the host vehicle, and detects an inter-vehicle distance between the host vehicle and the preceding vehicle. The inter-vehicle distance detection unit 12 transmits a detected inter-vehicle distance to the driver condition detection ECU 2 as the inter-vehicle distance signal. As for the inter-vehicle distance detection unit 12, it is possible to use a front radar such as laser radar or millimeter wave radar for example.

The steering angle sensor 13 functions as the travelling condition detection unit that detects the travelling condition of the host vehicle, and, in detail, is the steering amount detection unit provided with a function of detecting steering amount of a host vehicle steering wheel. As for the steering angle sensor 13, for example, a sensor that detects a steering angle of a steering wheel (not shown) which is caused pt by a driver, is used. In the steering angle sensor 13, a detected steering angle is transmitted to the driver condition detection ECU 2 as the steering angle signal. Moreover, the driver condition detection ECU 2 is configured to calculate a steering angular velocity based on the steering angle signal from the steering angle sensor 13, thereby storing the calculated steering angular velocity in the information storage unit 23 described below.

The lateral location detection unit 14 is a sensor that detects a lateral location based on a central line of a traffic lane where the host vehicle travels. The lateral location detection unit 14 transmits the detected lateral location to the driver condition detection ECU 2 as a lateral location signal. Moreover, as for the lateral location detection unit 14, for example, it is possible to use such a lateral location detection unit as causes the lateral location to be detected based on a white line of the traffic lane (lane marker) in a front image taken by a camera. Moreover, the driver condition detection ECU 2 is configured to calculate a lateral angular velocity based on the amount of variation of the lateral location signal from lateral location detection unit 14, thereby storing a calculated lateral angular velocity in the information storage unit 23 described below.

The vehicle velocity sensor 15 is a sensor that detects a vehicle velocity. The vehicle velocity sensor 15 transmits the detected vehicle velocity to the driver condition detection ECU 2 as a vehicle velocity signal.

The front camera 16 is installed at the front portion of the host vehicle, images a predetermined range of the front of the host vehicle, and produces an image data such as the preceding vehicle and a road. Imaging by the front camera 16 and producing the image data are performed every predetermined time, and the produced image data is consecutively output to a curvature calculation unit 22 of the driver condition detection ECU 2.

The warning device 17 is a device that gives a warning to a driver corresponding to a driving consciousness degradation information output from the driver condition detection ECU 2, and requires sending notice to the driver. As for the warning device 17, for example, it is possible to use a speaker that sends a voice to the driver.

The driver condition detection ECU 2, for example, is configured to have a CPU, a ROM, a RAM, and the like, and is provided with an information acquisition unit 21, the curvature calculation unit 22, the information storage unit 23, a normal steering amount calculation unit 24, an excessive correction assessment unit 25, and a driving consciousness degradation assessment unit 26.

The information acquisition unit 21 repeatedly acquires various kinds of signals output continuously in a time series from the preceding vehicle size detection unit 11, the inter-vehicle distance detection unit 12, the steering angle sensor 13, the lateral location detection unit 14, and the vehicle velocity sensor 15, and then stores each of the signals in the information storage unit 23.

The curvature calculation unit 22 acquires an image information of a travelling road ahead of a vehicle taken by the front camera 16, and then calculates a curvature of the travelling road based on the image information. The curvature of the travelling road, for example, is calculated based on a detection condition of the white line of the travelling road. The curvature calculation unit 22 stores the calculated curvature of the travelling road in the information storage unit 23.

The normal steering amount calculation unit 24 calculates a normal steering amount based on a look-ahead model by using the size of the preceding vehicle, the inter-vehicle distance, the steering angle, the lateral location, the vehicle velocity, the lateral angular velocity, a road curvature, and the like which are stored in the information storage unit 23. A normal steering amount is to indicate the steering angle supposed to be steered in a driver's normal consciousness state, and is also referred to as a normal steering range or steering variation. Moreover, the normal steering amount is an indicator used for assessing a driver's consciousness degradation described below. Here, the normal steering amount calculation unit 24 functions as a threshold value setting unit.

By the way, when the driver's consciousness state degrades, a variation of a steering gets great, and when the variation gets great, a correction of the steering accompanying therewith gets excessive. Here, an excessive correction of the steering is referred to perform a correction in surplus compared to the steering amount which should be corrected originally. The excessive correction assessment unit 25 is provided with a function calculating a difference between the normal steering amount and the steering amount detected by the steering angle sensor 13 as an indicator indicating whether a driver's correction of the steering is excessive. Moreover, the difference is capable of being calculated as a Euclidean distance or a mahalanobis between the normal steering amount and an actual steering amount.

The driving consciousness degradation assessment unit 26 assesses that the driver is in the consciousness degradation state when the difference calculated by the excessive correction assessment unit 25 is greater than or equal to a predetermined value or more, and assesses that the driver is not in the consciousness degradation state in the other cases. The driving consciousness degradation assessment unit 26 gives a warning to the driver by the warning device 17 when it is assessed that the driver is in the consciousness degradation state. Here, the driving consciousness degradation assessment unit 26 functions as the consciousness degradation assessment means.

Figure 2:
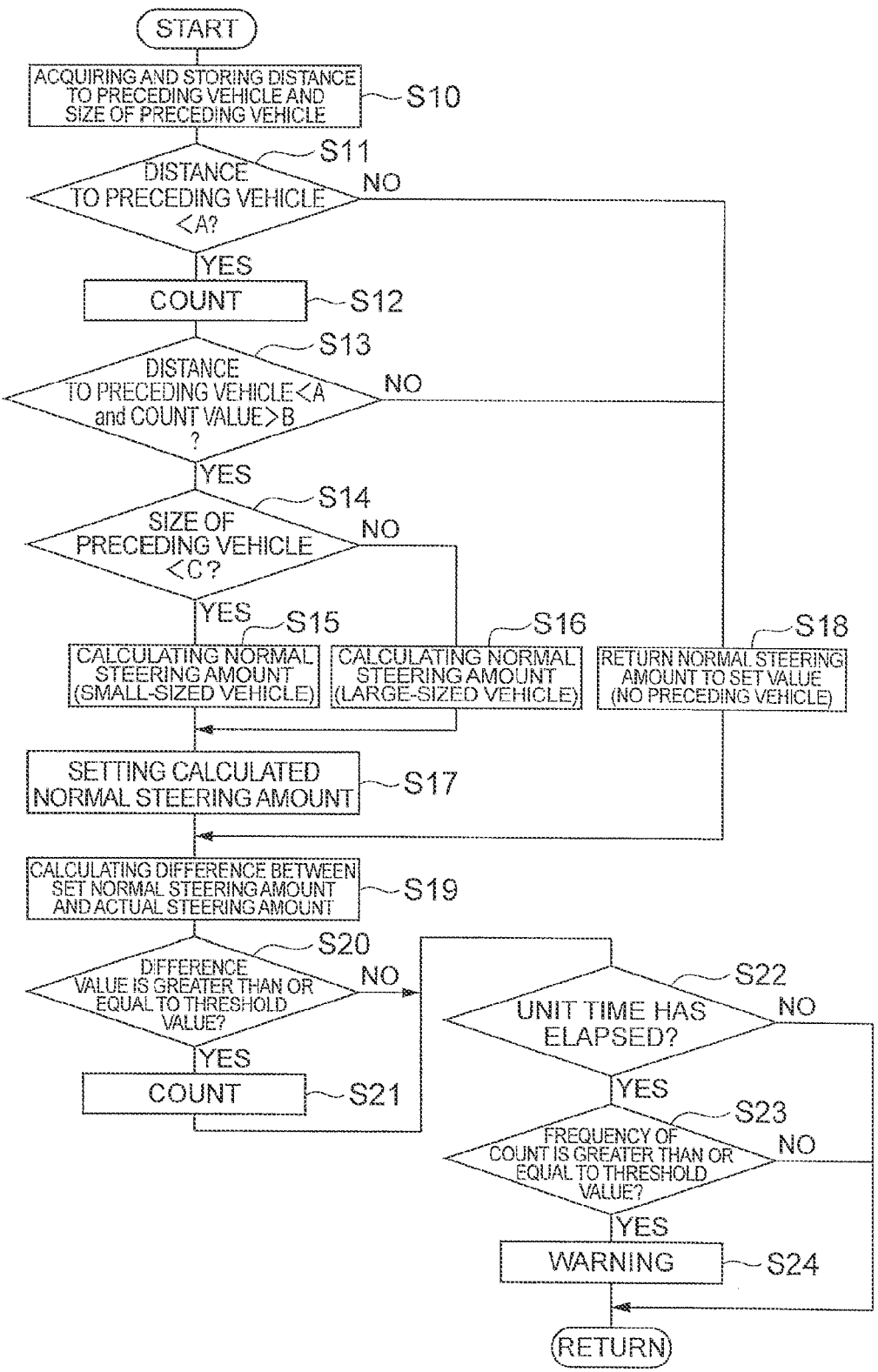
FIG. 2 is a flow chart illustrating a processing procedure of the driver condition assessment device operated by a driver condition detection ECU shown in FIG. 1.

Next, a description will be given regarding an operation of the driver condition assessment device 1 according to the embodiment. A routine for processing driving consciousness degradation assessment shown in FIG. 2 is performed by the driver condition detection ECU 2 during a travelling of a vehicle where the driver condition assessment device 1 is installed. For example, a routine for processing driving consciousness degradation assessment is repeatedly operated every 100 ms.

First, in a step S10, by acquiring signals which is output from the preceding vehicle size detection unit 11, the inter-vehicle distance detection unit 12, and the like, the signals are stored in the information storage unit 23, and together with this, by separately calculating the steering angle velocity and the lateral location velocity based on the signals, the calculated values are also stored in the information storage unit 23.

Further, in a step S11, it is assessed whether the inter-vehicle distance between the host vehicle and the preceding vehicle is below a predetermined value A or not. When the inter-vehicle distance is below the predetermined value A, the step S12 proceeds to a step S13 by increasing a proceeding count value in one increment. In addition, in the step S11, when the inter-vehicle distance is greater than or equal to the predetermined value A, the step S11 proceeds to a step S18.

In the step S13, it is assessed whether the inter-vehicle distance between the host vehicle and the preceding vehicle is below the predetermined value A and the count value is greater than a predetermined value B, or not. Further, when the inter-vehicle distance is below the predetermined value A and the count value is greater than the predetermined value B, the step 13 proceeds to the step S14. Further, when the inter-vehicle distance is greater than or equal to the predetermined value A, or the count value is below the predetermined value B, the step S13 proceeds to the step S18. Moreover, to the predetermined value B, for example, 300 are set.

In a step S14, it is assessed whether the size of the preceding vehicle acquired in the step S10 is below a predetermined value C or not. Specifically, for example, it is possible to perform assessment in the step S14 according to assessing whether the maximum loading capacity of the preceding vehicle that the preceding vehicle size detection unit 11 has detected with the communicator is below the maximum loading capacity corresponding to the predetermined value C stored in the information storage unit 23 beforehand or not. Further, according to a result of the assessment, when where the size of the preceding vehicle is below the predetermined value C, the step S14 proceeds to a step S15, and when the size is greater than or equal to the predetermined value C, the step S14 proceeds to a step S16.

In the step S15, after the normal steering amount calculation unit 24 performs a calculation of the normal steering amount when the preceding vehicle is a small-sized vehicle, the step S15 proceeds to a step S17. In the step S16, after the normal steering amount calculation unit 24 performs a calculation of the normal steering amount when the preceding vehicle is a large-sized vehicle, the step S16 proceeds to the step S17.

The step S17 proceeds to a step S19 by performing a setting of the normal steering amount calculated in the step S15 or the step S16. Further, in the step S18, the next step becomes a step S19 by performing processing of returning the normal steering amount to a value beforehand set when the preceding vehicle is not present.

In the step S19, the excessive correction assessment unit 25 calculates a difference between the normal steering amount which is the steering angle in a normal consciousness state calculated in the step S15 or the step S16, and the actual steering amount acquired by the steering angle sensor 13 in the step S10, and then the step S19 proceeds to a step S20.

In the step S20, it is assessed whether the difference calculated in the step S19 is greater than or equal to the predetermined threshold value or not, and when the difference is below the threshold value, the step S20 proceeds to a step S22. Further, when the difference is greater than or equal to the threshold value, the step S20 proceeds to the step S22 by counting a frequency assessed to be greater than or equal to the threshold value in a step S21.

In the step S22, it is assessed whether a unit time has elapsed or not based on a measurement of a timer not shown, and when the unit time has not elapsed, processing ends at the state, and when the unit time has elapsed, the step S22 proceeds to a step S23.

Next, in the step S23, the driving consciousness degradation assessment unit 26 assesses whether a frequency of a count in the step S21 is greater than or equal to the predetermined threshold value or not. And when the frequency of the count is below the threshold value, processing ends at the state. On the other hand, when the frequency of the count is greater than or equal to the predetermined threshold value, the driving consciousness degradation assessment unit 26 assesses that the driver is in the consciousness degradation state, and then the step S23 proceeds to a step S24, where processing ends by giving a warning to the driver that the driver's consciousness is degraded by the warning device 17.

By the way, as described above, there are the normal steering amount when the preceding vehicle is the small-sized one, the normal steering amount when the preceding vehicle is a large-sized one, and the normal steering amount is present when the preceding vehicle is not present. However, a maximum value of an absolute value of the normal steering amount is calculated to get greater in an order of the case of no preceding vehicle, the case of preceding vehicle being small-sized, and the case of preceding vehicle being large-sized. That is, it gets more difficult to assess in proportion that the driver's consciousness is degraded as the size of the preceding vehicle gets greater.

As described above, the reason why the normal steering amount is calculated is as follows. A fluctuation is likely to occur even when the driver's consciousness is not degraded since a driver's visibility gets narrower when preceding vehicle that is large-sized compared to both preceding vehicle that are small-sized and when there is no preceding vehicle. Therefore, it is possible to prevent assessing the fluctuation as the consciousness degradation. Further, based on the above described, the maximum value of the absolute value of the normal steering amount when the preceding vehicle is small-sized, is greater than the maximum value of the absolute value of the normal steering amount when the preceding vehicle is not present.

As described above, it is possible to reduce a wrong assessment of the driver's consciousness being degraded due to the fluctuation of the host vehicle when the preceding vehicle is a large-sized one since a calculation of the normal steering amount is performed corresponding to the size of the preceding vehicle in the routine for processing driving consciousness degradation assessment in the driver's condition assessment device 1 according to the embodiment of the invention.

Figure 3:
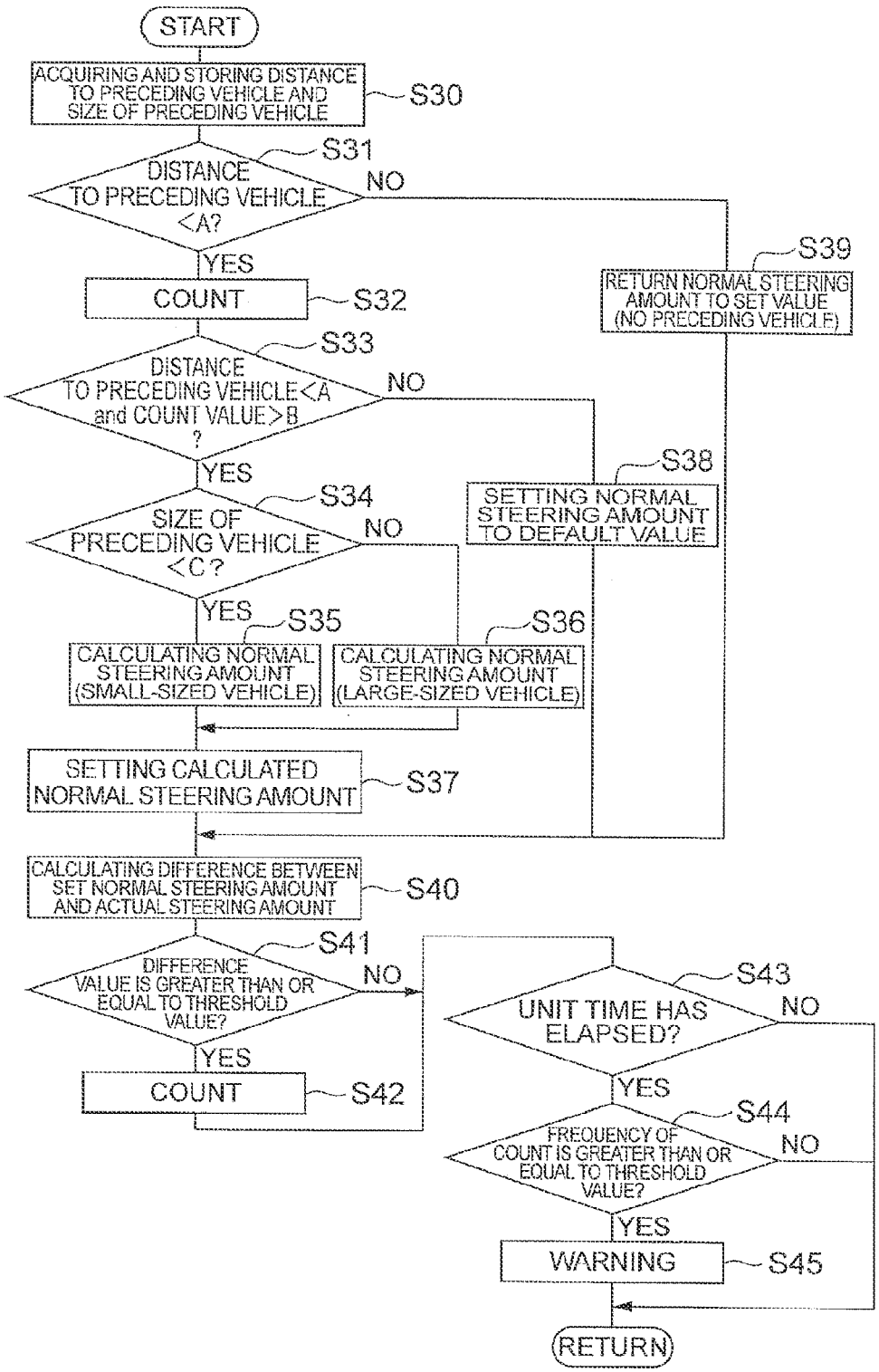
FIG. 3 is a flow chart illustrating a processing procedure of other driver condition assessment device operated by a driver condition detection ECU shown in FIG. 1.

Hereinafter, the other example of the above described routine for processing driving consciousness assessment will be described in accordance with FIG. 3. The characteristic of the processing illustrated in FIG. 3 is that the processing resets the normal steering amount to a default value (initial value) in a predetermined case. As for a content of the processing illustrated in FIG. 3, only the processing after performing an assessment about whether the size of the preceding vehicle is below the predetermined value A, and a count value is greater than B, or not is different from the processing illustrated in FIG. 2. That is, the processing of steps S30 to S37 in FIG. 3 is the same as the processing of steps S10 to S17 in FIG. 2, and the processing of a step S39 is the same as the processing of a step S18, and the processing of steps S40 to S45 is the same as the processing of steps S19 to S24.

In the processing illustrated in FIG. 3, in a step S33, it is assessed whether the inter-vehicle distance between the host vehicle and the preceding vehicle is below the predetermined value A, and the count value is greater than B or not. When the inter-vehicle distance is below the predetermined value A, and the count value is greater than B, the step S33 proceeds to a step S34, and thereafter, the same processing as performed at the step S14 illustrated in FIG. 2 is repeated. Further, in the step S33, when the inter-vehicle distance is greater than or equal to the predetermined value A, or the count value is smaller than or equal to B, the step S33 proceeds to a step S38. The step S38 proceeds to the step S40 by performing a processing of returning the set normal steering amount to the predetermined default value, and thereafter, the same processing as the processing in FIG. 2 is performed.

As described above, in the processing illustrated in FIG. 3, it is possible to reduce a wrong assessment due to the normal steering amount set when the preceding vehicle is present since the normal steering amount is returned to the default value when the preceding vehicle is not continuously present for the fixed time within the fixed distance of the host vehicle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the example that the size of the preceding vehicle is detected by using the preceding vehicle size detection unit 11 which is provided with the communicator has been described in the above, but there is no need to use only the preceding vehicle size detection unit 11. Specifically, it is possible to adopt such an embodiment that calculates the size of the preceding vehicle by an stored program of the driver condition detection ECU 2 by using the inter-vehicle distance detected by the inter-vehicle distance detection unit 12, and an image of the preceding vehicle taken by the front camera 16.

Further, in the embodiments, an example has been described, such that the consciousness degradation is assessed based on whether the difference between the actual steering amount and the calculated normal steering amount is greater than or equal to the threshold value or not by performing a calculation of the normal steering amount corresponding to the size of the preceding vehicle, but the method to assess the consciousness degradation is not limited to this. For example, it is possible to adopt such an embodiment that directly changes the threshold value (threshold value in the step S20 or S41) of the difference assessed as being in the consciousness degradation state by the driving consciousness degradation assessment unit 26 according to the size of the preceding vehicle, and this case also is capable of acquiring the same effect as the cases of the embodiments.

Further, like the embodiments, there is no need to use only the difference between the actual steering amount and the calculated normal steering amount for assessing the consciousness degradation. That is, when there is an indicator that is capable of detecting whether the travelling condition of the vehicle is deviating or not compared to the normal time (when the driver is aware), it is possible to use the indicator instead of the steering amount. Specifically, for example, instead of the steering amount, it is possible to adopt such an embodiment that assesses the consciousness degradation based on whether a deviation amount of the lateral location to a traffic lane exceeds the predetermined value or not, or whether an approach angle of the vehicle to the traffic lane exceeds the predetermined angle or not, and this case also is capable of acquiring the same effect as the cases of the embodiments.

REFERENCE SIGNS LIST

1 DRIVER CONDITION ASSESSMENT DEVICE 2 DRIVER CONDITION DETECTION ECU 11 PRE-

CEDING VEHICLE SIZE DETECTION UNIT 12 INTER-VEHICLE DISTANCE DETECTION UNIT 13 STEERING ANGLE SENSOR 14 LATERAL LOCATION DETECTION UNIT 15 VEHICLE VELOCITY SENSOR 16 FRONT CAMERA 17 ALARMING DEVICE 21 INFORMATION ACQUISITION UNIT 22 CURVATURE CALCULATION UNIT 23 INFORMATION STORAGE UNIT 24 NORMAL STEERING AMOUNT CALCULATION UNIT 25 EXCESSIVE CORRECTION ASSESSMENT UNIT 26 DRIVING CONSCIOUSNESS DEGRADATION ASSESSMENT UNIT

The invention claimed is:

1. A driver condition assessment device that assesses a driver condition of a host vehicle by assessing whether a predetermined driving operation is performed, comprising:
    travelling condition detection means for detecting a travelling condition of the host vehicle;
    size detection means for detecting a size of a preceding vehicle present ahead of the host vehicle;
    consciousness degradation assessment means for assessing whether a consciousness of a driver of the host vehicle is degraded when a travelling condition detected by the travelling condition detection means exceeds a predetermined threshold value; and
    threshold value setting means for setting the predetermined threshold value depending on the size of the preceding vehicle detected by the size detection means;
    wherein the threshold value setting means performs setting the threshold value such that the larger the size of the preceding vehicle, the less likely consciousness will be assessed as being degraded.

2. The driver condition assessment device according to claim 1, wherein the travelling condition detection means is steering amount detection means for detecting a steering operation amount of the host vehicle, wherein the steering operation amount includes a number of changes in steering angle or a quantity of a single change in steering angle.

3. The driver condition assessment device according to claim 1, wherein the threshold value setting means performs setting the threshold value corresponding to the size of the preceding vehicle when the preceding vehicle is continuously present for a fixed time within a fixed distance of the host vehicle, and sets the threshold value to a predetermined initial value when the preceding vehicle is not continuously present for the fixed time within the fixed distance of the host vehicle.

* * * * *